(12) United States Patent
Schroeder et al.

(10) Patent No.: US 6,977,013 B2
(45) Date of Patent: Dec. 20, 2005

(54) POWDER COATING SYSTEM CENTRAL CONTROLLER

(75) Inventors: Joseph G. Schroeder, N. Royalton, OH (US); Vince Bednarz, Stow, OH (US); Jeffrey Perkins, Amherst, OH (US); Stephen Nemethy, Lakewood, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 10/251,003

(22) Filed: Sep. 20, 2002

(65) Prior Publication Data

US 2003/0116086 A1    Jun. 26, 2003

Related U.S. Application Data

(63) Continuation-in-part of application No. 10/039,377, filed on Jan. 2, 2002, which is a continuation of application No. 09/563,563, filed on May 3, 2000, now Pat. No. 6,379,465.

(60) Provisional application No. 60/154,492, filed on Sep. 17, 1999.

(51) Int. Cl.[7] .............................................. B05C 11/10
(52) U.S. Cl. ...................... 118/679; 118/697; 118/713; 239/67; 239/68; 239/69; 700/123
(58) Field of Search ....................... 118/308, 313, 314, 118/315, 316, 662, 672, 674, 676, 679, 697, 118/696, 706, 712, 713, 695; 239/61, 67, 239/68, 69; 222/52, 59, 14; 700/123; 427/469, 427/8, 9, 10, 477, 479, 480

(56) References Cited

U.S. PATENT DOCUMENTS

| | | | |
|---|---|---|---|
| 3,400,891 A | 9/1968 | Mattwell | |
| 4,357,900 A | 11/1982 | Buschor | |
| 4,937,746 A | 6/1990 | Brundisini | |
| 4,951,600 A * | 8/1990 | Soshi et al. | ................. 118/696 |
| 5,225,239 A | 7/1993 | Ostin | |
| 5,337,957 A | 8/1994 | Olson | |
| 5,443,642 A | 8/1995 | Bienduga | |
| 5,566,042 A | 10/1996 | Perkins et al. | |

(Continued)

FOREIGN PATENT DOCUMENTS

EP    301 586    2/1989

(Continued)

OTHER PUBLICATIONS

European Search Report (3 pages), Application No. EP 00 30 7777.

(Continued)

Primary Examiner—George Koch
(74) Attorney, Agent, or Firm—Calfee, Halter & Griswold LLP

(57) ABSTRACT

A central controller for a powder coating system has a single processor connected to a memory, a gun controller input/output device and gun control logic for controlling a characteristic of a spray gun. An air flow controller input/output device and air flow control logic for controlling a characteristic of a pump providing air flow may also be included. A process input/output device for electrically communicating with a process input or a process output may also be included. Part identification and tracking logic, gun triggering logic, gun movement logic, booth control logic, part profiling logic and system monitoring and logging logic may also be included.

21 Claims, 5 Drawing Sheets

U.S. PATENT DOCUMENTS

| | | |
|---|---|---|
| 5,718,767 A | 2/1998 | Crum et al. |
| 5,725,161 A | 3/1998 | Hartle |
| 5,725,670 A | 3/1998 | Wilson et al. |
| 5,743,958 A | 4/1998 | Shutic |
| 5,788,728 A | 8/1998 | Solis et al. |
| 5,816,508 A | 10/1998 | Hollstein et al. |
| 5,843,515 A | 12/1998 | Crum et al. |
| 5,847,945 A | 12/1998 | Burtin et al. |
| 5,904,294 A | 5/1999 | Knobbe et al. |
| 5,908,162 A | 6/1999 | Klein et al. |
| 5,938,126 A | 8/1999 | Rehman et al. |
| 6,017,394 A | 1/2000 | Crum et al. |
| 6,112,999 A | 9/2000 | Fingleton et al. |
| 6,132,511 A | 10/2000 | Crum et al. |
| 6,253,934 B1 | 7/2001 | Schroeder et al. |
| 6,375,093 B1 | 4/2002 | Fulkerson et al. |
| 6,375,094 B1 | 4/2002 | Schroeder et al. |
| 6,379,465 B1 | 4/2002 | Perkins et al. |
| 2002/0088397 A1 | 7/2002 | Perkins et al. |

FOREIGN PATENT DOCUMENTS

| | | |
|---|---|---|
| EP | 0 578 426 A2 | 6/1993 |
| EP | 730 759 | 8/1999 |
| WO | WO 98/35104 | 8/1998 |

OTHER PUBLICATIONS

Sure Coat® Rack Mount Automatic Controller—Customer Product Manual Part 303 818A.

Sure Coat® Modular Gun Control System product information, 2000.

Smart-Coat™ Control System product information, 1998.

Powder Coating Control Systems product information, 2001.

Optitronic Powder Gun Control product information.

European Search Report from EP 03 25 5864 issued on May 19, 2005.

* cited by examiner

POWDER COATING SYSTEM CENTRAL CONTROLLER

RELATED APPLICATION

This application is a continuation-in-part of U.S. patent application Ser. No. 10/039,377, filed on Jan. 2, 2002, for COATING SYSTEM WITH CENTRALIZED CONTROL PANEL AND GUN MAPPING, which is a continuation of U.S. patent application Ser. No. 09/563,563, filed on May 3, 2000 U.S. Pat. No. 6,379,465 B1, (the "465 Patent"), which claims priority to U.S. Provisional Patent Application No. 60/154,492 filed Sep. 17, 1999, each owned in common by the assignee of the present invention, the entire disclosures all of which are frilly incorporated herein by reference.

FIELD OF THE INVENTION

The present invention relates to powder coating systems, and more particularly, to single processor central controllers for powder coating systems.

BACKGROUND OF THE INVENTION

Powder coating systems apply powder paints and coatings to a variety of products and parts. Such systems, particularly including electrostatic powder coating systems, can become quite complex, often including a plurality of spray guns with a plurality of electrical characteristics, or parameters. Control of the spray guns and other components and parameters is a critical component of the powder coating system.

It is known in the art to decentralize control of certain electrical characteristics of each spray gun by using a spray gun controller to control each spray gun in a system. In such a decentralized system, each spray gun controller includes a processor, memory and parameters stored in such memory to control a single gun. Such a system is shown in U.S. Pat. Nos. 5,718,767, 5,843,515, 6,017,394 and 6,132,511 (the "'767 et. seq. Patents") owned in common by the assignee of the present invention, the entire disclosures of which are fully incorporated herein by reference. Even under such decentralized systems, however, there is a need to centrally control all of the gun controllers and other components of the system, such as air pumps, booth functions, etc. In the systems shown in the '767 et. seq. Patents, centralized control is attempted by use of multiple processors on multiple printed circuit boards, which each processor controlling a different set of components. For example, a system of the '767 et. seq. Patents uses five processors to control the gun controllers, part position control, operator control, external pc control and gateway central processing.

Various systems have been developed which reduce the number of processors involved in centralized control of a powder coating system. Such a system is shown in the '465 Patent, and in powder coating control systems commercially available from the assignee of the present invention under the trademarks SURE COAT®, VERSA-SCREEN® and SMART-COAT® (the above-referenced systems collectively the "Sure/Smart Coat Systems"). In such systems, at least two processors are used to control just the gun controllers—one processor for the component of the system which communicates with the gun controllers and one processor for an operator control panel which centralizes some system control features. If automatic (i.e., remote) control is desired, or if control of other system components, such as booth controls or digital air flow controllers is desired, at least a third processor in a connected programmable logic controller (a "PLC") is required.

The required use of multiple processors for centralized control of a powder coating system increases the complexity and cost of such a system. Therefore, it is highly desirable to provide a central control for a powder coating system which uses a reduced number of processors to control the gun controllers and other components of the system. Furthermore, the use of multiple processors generally requires multiple operator interfaces to view and control all system parameters. Therefore, it is also highly desirable to provide a central control for a powder coating system which uses a reduced number of processors and a single operator interface to view and control all of the system parameters.

The required use of multiple processors furthermore typically requires multiple enclosures to house multiple components of a controller of a powder coating system, further increasing the cost and complexity of the system. It is thus highly desirable to provide a controller for a powder coating system which is contained in a single enclosure.

SUMMARY OF THE INVENTION

In accordance with one embodiment of the present invention, a central controller is provided for a powder coating system of the type having a plurality of spray guns, each of which has a spray gun controller. The central controller may include a single processor connected to a memory, a gun controller input/output device and gun control logic for controlling a characteristic of a spray gun. The central controller may further include an air flow controller input/output device and air flow control logic for controlling a characteristic of a pump providing air flow. The central controller may further include a process input/output device for electrically communicating with a process input or a process output. The central controller may further include part identification and tracking logic, gun triggering logic, gun movement logic, booth control logic, part profiling logic and system monitoring and logging logic.

In accordance with another aspect of the invention, a powder coating system is provided which may include a plurality of spray guns, a plurality of spray gun controllers and a central controller which may include a single processor connected to a memory, a gun controller input/output device and gun control logic. The central controller may further include an air flow controller input/output device and air flow control logic.

In accordance with another aspect of the invention, a controller for a powder coating system is provided in a first enclosure. The controller may further include a second enclosure for additional gun controllers and air flow controllers.

An advantage of the present invention is that a central controller of the present invention contains a single processor and is less complex than prior art central controllers. An additional advantage of the present invention is that a central controller of the present invention is less costly than prior art central controllers. A further advantage of the present invention is that a controller of the present invention may be contained in a single enclosure which is less complex and costly than prior art multiple-enclosure controllers.

These and other aspects and advantages of the present invention will be apparent to those skilled in the art from the following description of the preferred embodiments in view of the accompanying drawings.

BRIEF DESCRIPTION OF THE DRAWINGS

The invention may take physical form in certain parts and arrangement of parts, preferred embodiments of which will be described in detail in this specification and illustrated in the accompanying drawings which form a part hereof, and wherein.

DETAILED DESCRIPTION OF THE PREFERRED EMBODIMENTS

Figure 1:
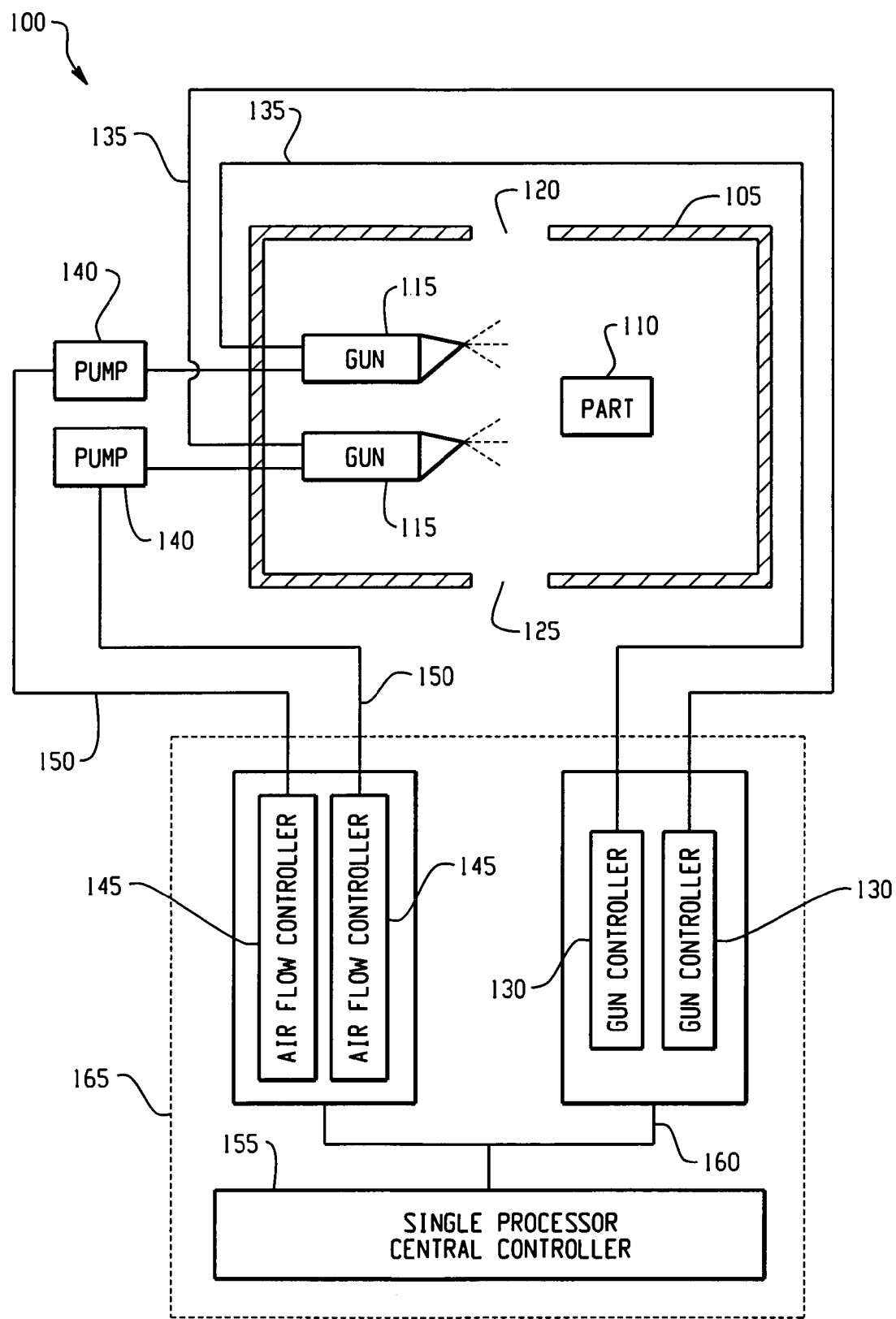
FIG. 1 is an exemplary block diagram of a powder spray system and central controller in accordance with one embodiment of the present invention.

The following includes definitions of exemplary terms used throughout the disclosure. Both singular and plural forms of all terms fall within each meaning. Except where noted otherwise, capitalized and non-capitalized forms of all terms fall within each meaning:

As used herein, "logic" is used generically and includes but is not limited to hardware, software and/or combinations of both to perform a function.

As used herein, "software" is used generically and includes but is not limited to one or more computer executable instructions, routines, algorithms, modules or programs including separate applications or from dynamically linked libraries for performing functions as described herein. Software may also be implemented in various forms such as a servlet, applet, stand-alone, plug-in or other type of application. Software can be maintained on various computer readable mediums as known in the art.

As used herein, "processor" is used generically and includes but is not limited to the logic circuitry that responds to and processes the basic instructions that drive a computing device. Commercially available examples of a processor are the microprocessors sold by Intel under the trademarks PENTIUM® and XEON®. As used herein, "single processor" means one processor or a plurality of processors operating in parallel and positioned on a single printed circuit board. As used herein, "operating in parallel" is used generically and means processing a set of program instructions with the objective of executing the instructions in less time than one processor, including but not limited to multiprocessing and symmetric multiprocessing. Commercially available examples of a plurality of processors operating in parallel are motherboards adapted for dual PENTIUM® processors as sold by Asus and Abit.

As used herein, "memory" is used generically and includes any form or combination of multiple forms of memory which is suitable for storing computer-readable data, including but not limited to flash memory, flash memory cards, any suitable form of RAM, including RAM chips, magnetic storage, including floppy disks and hard drives, and optical storage, including CD-ROMs.

As used herein, "spray gun controller," "gun controller" and "gun control circuit" are used interchangeably, generically and include the meaning set forth therefore in the '767 et. seq. Patents, the '465 Patent and the Sure/Safe Coat Systems. Generally, a gun controller includes a processor connected to a memory, the memory storing a plurality of electric characteristics, or parameters, of a spray gun. A gun controller may control the power supply for an electrostatic charging spray gun.

As used here, "input/output device" is used generically and includes any device which transfers data or facilitates the transfer of data to and from an industrial control device or PLC, including but not limited to a network interface card, an Ethernet card, a CAN card, a video card, a USB port, an IEEE 1394 port, a RS232 port, a serial port and a parallel port.

With reference to FIG. 1, an overview of a powder coating system 100 is shown. Powder coating system 100 generally includes, for example, a booth 105 for containing a part 110 which is sprayed by at least one spray gun 115. The part 110 enters the booth 105 through opening 120, is transported past spray guns 115, and exits the booth 105 through opening 125. Each spray gun 115 is electrically connected to a spray gun controller 130 by any suitable connection 135, including but not limited to shielded wire.

Each spray gun controller 130 provides control for a plurality of electrical characteristics of the spray gun 115. The plurality of electrical characteristics includes, but is not limited to, the spray parameters described in the '767 et. seq. Patents and the electrostatic parameters described in the '465 Patent and the Sure/Smart Coat Systems, including but not limited to KV Control, AFC Control, charging voltage, microamp current and Select Charge Mode.

A plurality of powder (venturi style) pumps 140 provide powder flow to the spray guns 115 and are pneumatically connected to a plurality of digital air flow controllers 145 by any suitable connection 150, including but not limited to polyethylene air tubing. Each digital air flow controller 145, also known as an air flow control circuit, controls a plurality of characteristics for operating each powder pump 140. In this example, the digital air flow controller 145 is a digital air flow controller as disclosed in the SMART-COAT® control system line of powder control system controllers available from Nordson Corporation. The plurality of characteristics for operating each air pump 140 includes, but is not limited to, powder flow-air flow-rate, atomizing air flow-rate and gun electrode wash. A digital air flow controller may control the air flow through a pump which supplies powder coating material to one of the guns.

The digital air flow controllers 145 and the gun controllers 130 electrically communicate with single processor central controller 155 by any suitable connection 160, including but not limited to shielded wire and CAN network connectivity. In one embodiment of the present invention, single processor central controller 155 provides centralized control of the digital air flow controllers 145 and associated pump operating characteristics, the gun controllers 130 and associated electrical characteristics, and additional powder coating system components and functions. In another embodiment of the present invention, the digital air flow controllers 145, the gun controllers 130 and the central controller 155 are contained in a single integrated enclosure 165.

Figure 2:
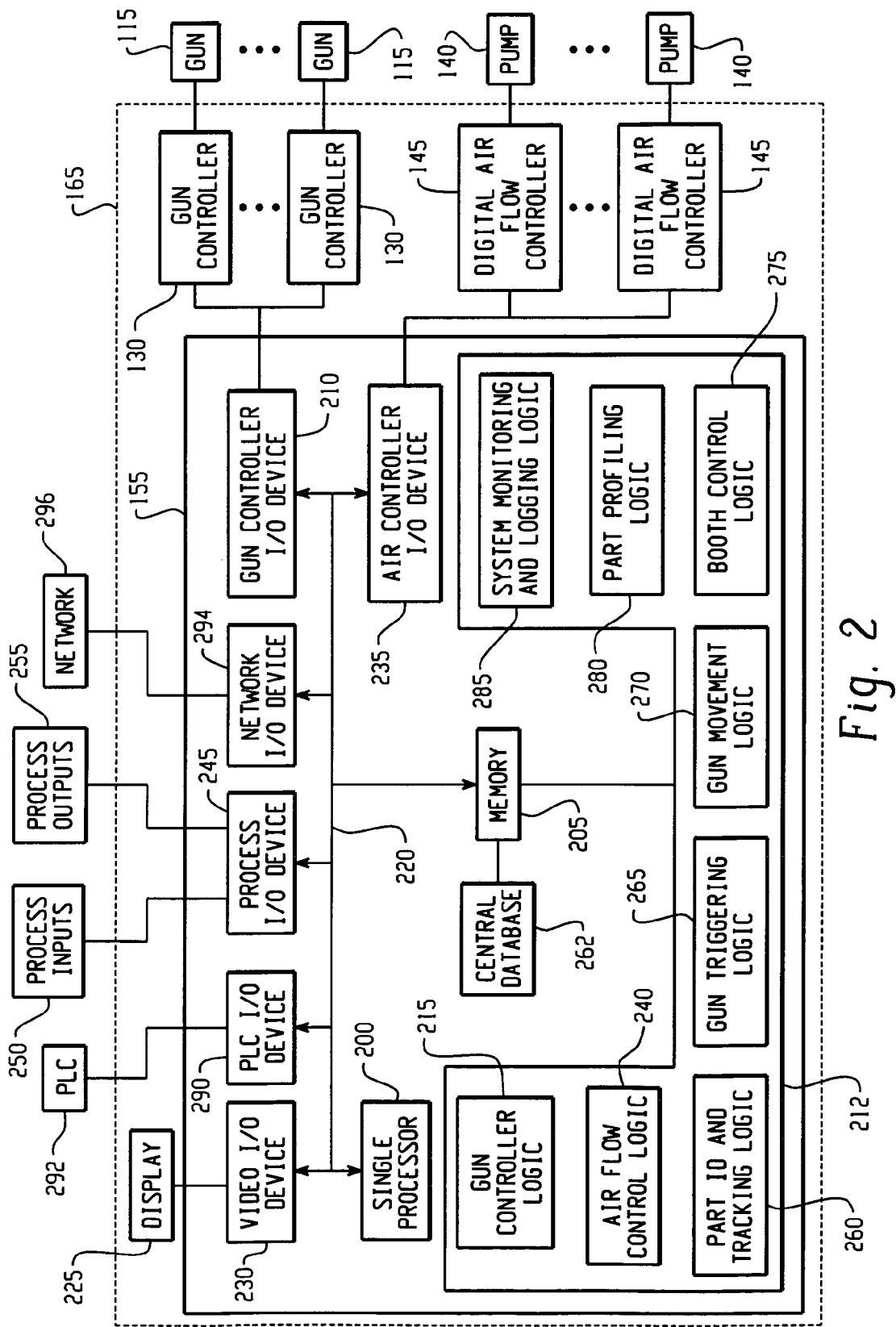
FIG. 2 is an exemplary block diagram of a central controller in accordance with one embodiment of the present invention.

With reference to FIG. 2, a single processor central controller 155 of an embodiment of the present invention is shown. The single processor central controller 155 comprises a single processor 200, a memory 205, at least one input/output device and system control logic 212. System control logic 212 controls the centralized components and functionality of the powder coating system, i.e., system control logic 212 controls non-decentralized powder coating system functionality. Centralized functions of the powder coating system which may be controlled by system control logic 212 include, but are not limited to, control of gun controllers, control of digital air flow controllers, control of part identification and tracking, gun triggering, gun movement, control of booth parameters, part profiling and system monitoring and logging. System control logic 212 optionally includes at least one of the following logic components: gun controller logic 215, air flow controller logic 240, part identification and tracking logic 260, gun triggering logic 265, gun movement logic 270, booth control logic 275, part profiling logic 280 and system monitoring and logging logic 285. System control logic 212 optionally includes additional logic components which control any other suitable centralized component or functionality. System control logic 212 is stored at least temporarily in the memory 205 for retrieval and processing by single processor 200.

The single processor 200 is connected to the memory 205 by any suitable electrical connection 220. In an embodiment, single processor central controller 155 is an industrial controller board which includes a printed circuit board ("PCB") upon which single processor 200 is mounted. Typically in such an arrangement the mounted single processor 200 is in electrical connection with multiple parts of the PCB via electrically-conductive printing on the circuit board. For example, if memory 205 is a flash memory card, electrical connection 220 is electrically-conductive printing on the circuit board which connects a socket for containing the flash memory card with the single processor, among other PCB parts.

In an embodiment of the present invention, a single processor central controller 155 includes a gun controller input/output device 210 and the system control logic 212 includes gun control logic 215. The gun controller input/output device 210 is any suitable input/output device for facilitating input and output of data between gun controllers 130 and single processor 200 directly or via any suitable method, including via electrical connection 220. While input/output devices and other devices described herein in embodiments of the present invention are described as being connected to the single processor, it will be known that the input/output devices and other devices may be connected to other parts of the central controller and furthermore may be connected to the single processor 200 indirectly, by, e.g., an intervening printed bus 220, I/O controller or system controller. The gun controller input/output device 210 electrically communicates with gun controllers 130 connected to spray guns 115 by any suitable method, including but not limited to a input/output device card slot integrated into central controller 155. In an embodiment of the present invention, the gun controller input/output device 210 is a CAN card commercially available from Contemporary Control Systems, Inc. 2431 Curtiss Street, Downers Grove, Ill. 60515 as part number CAN104-DN. The CAN card is part of a CAN network, an industrial control network with a high communication capacity which facilitates connection of a plurality of gun controllers 130 to central controller 155 via an input/output card or similar device which is connected to single processor 200. In embodiments wherein the central controller 155 comprises an industrial controller including a PCB, gun controller input/output device 210 is typically a CAN card plugged into an available input/output slot in the industrial control device.

Gun controller logic 210 effectuates modification of electrical characteristics of the spray guns 115 as controlled by gun controllers 130 by passing input from a user of the powder coating system or other external inputs to gun controllers 130. Gun controller logic 210 is stored at least temporarily in the memory 205 for retrieval and processing by single processor 200. In an embodiment of the present invention, a display device 225 is connected to the single processor central controller 155 by a video input/output device 230 or by any suitable method. Typically, the video input/output device 230 is a stand-alone video card which plugs into a slot available in the central controller 165 or, particularly if the central controller 155 comprises an industrial controller including a PCB, the video input/output device 230 may comprise a video processor and video RAM integrated into the industrial control device's PCB. The display device 225 is any suitable display device, including but not limited to a CRT monitor, an LDC flat monitor or a touch monitor, either CRT or LCD. In an embodiment of the present invention, the display device 225 is an LCD touch screen which accepts input from a user of the powder coating system by sensing the user's touch of the LCD screen via technology well-known in the art.

In an embodiment of the present invention wherein a touch LCD screen communicates with the single processor central control 155 via a video input/output device 230, gun controller logic 215 effectuates modification of electrical characteristics stored in the gun controllers 130 after receiving input from a user using the touch screen. The user inputs any change or value desired for an electrical characteristic. Upon receiving such input, gun controller logic 215 passes to the appropriate gun controller 130 the modifications or values inputted by the user. Actual changes to the selected electrical characteristics are subsequently performed by the appropriate gun controller. Typically, gun controller logic 215 displays a menu of electrical gun controls to a user on display device 225 as is known in the art and shown, for example, in the Sure/Smart Coat Systems. As exemplified in such systems, gun controller logic 215 allows a user to select an individual gun controller 130 or a plurality of gun controllers 130, including all of gun controllers 130, for control. After selecting which gun controller(s) 130 to control, gun controller logic 215 allows a user to select the electrical characteristic for the gun controller(s) 130 which the user desires to control. After receiving input regarding such desired controls for the identified electrical characteristics of the identified gun controller(s) 130, gun controller logic 215 passes such input to gun controllers 130 via the gun controller input/output device 210. Exemplary gun controller logic as known in the art is further shown in the '465 Patent and by the Sure/Smart Coat Systems, including logic relating to a "set all" input received from a user.

In an additional embodiment of the present invention, the single processor central controller 155 further comprises an air controller input/output device 235 and the system control logic 212 includes air flow control logic 240. The air controller input/output device 240 is any suitable input/output device for facilitating input and output of data between digital air flow controllers 145 and single processor 200 directly or via any suitable method, including via electrical connection 220. The air controller input/output device 235 electrically communicates with the digital air flow controllers 145 connected to pumps 140 by any suitable method, including but not limited to an input/ouput device card slot integrated into the central controller 155. In an embodiment of the present invention, the air controller input/output device 235 is a CAN card. In still another embodiment, the gun controller input/output device 210 and the air controller input/output device 235 are integrated into a single CAN card which is part of a CAN network.

Air flow control logic 240 effectuates modification of characteristics of the pumps 140 as controlled by the digital air flow controllers 145 based upon input from a user of the powder coating system or other external inputs. Air flow control logic 240 is stored at least temporarily in the memory 205 for retrieval and processing by single processor 200. Similarly to gun controller logic 210, in an embodiment wherein a touch LCD screen is used to obtain input from a user, air flow control logic 240 effectuates modification of characteristics stored in the digital air flow controllers 145 after receiving input from a user using the touch screen. After receiving input regarding which pump characteristics to control and the value of the control desired, air flow control logic 240 passes to the appropriate digital air flow controller 145 the modifications and values inputted by the user. Typically, a menu display regarding pump selection and characteristic selection, similar to the menu displayed for gun controller selection and electrical characteristic selection, is provided to the user. Upon receiving input from the user, air flow control logic 240 passes such input to the appropriate digital air flow controller 145 via the air controller input/output device 235. Exemplary air flow control logic as known in the art is further shown in the Smart Coat Systems, including logic relating to a "set all" input inputted by a user. In another embodiment, the gun electrical characteristics and the pump characteristics are provided in the same display for a gun.

In an additional embodiment of the present invention, the single processor central controller further comprises a process input/output device 245. The processor input/output device 245 is any suitable input/output device or combination of multiple input/output devices for facilitating input from process inputs 250 to the single processor 200 and output to process outputs 255 from the single processor 200. Input to and output from the single processor 200 is facilitated by any suitable method, including via electrical connection 220. Typically, process input/output device 245 is an input/output device or combination of multiple input/output devices adapted to interface with a particular process input 250 or a particular process output 255.

Figure 3:
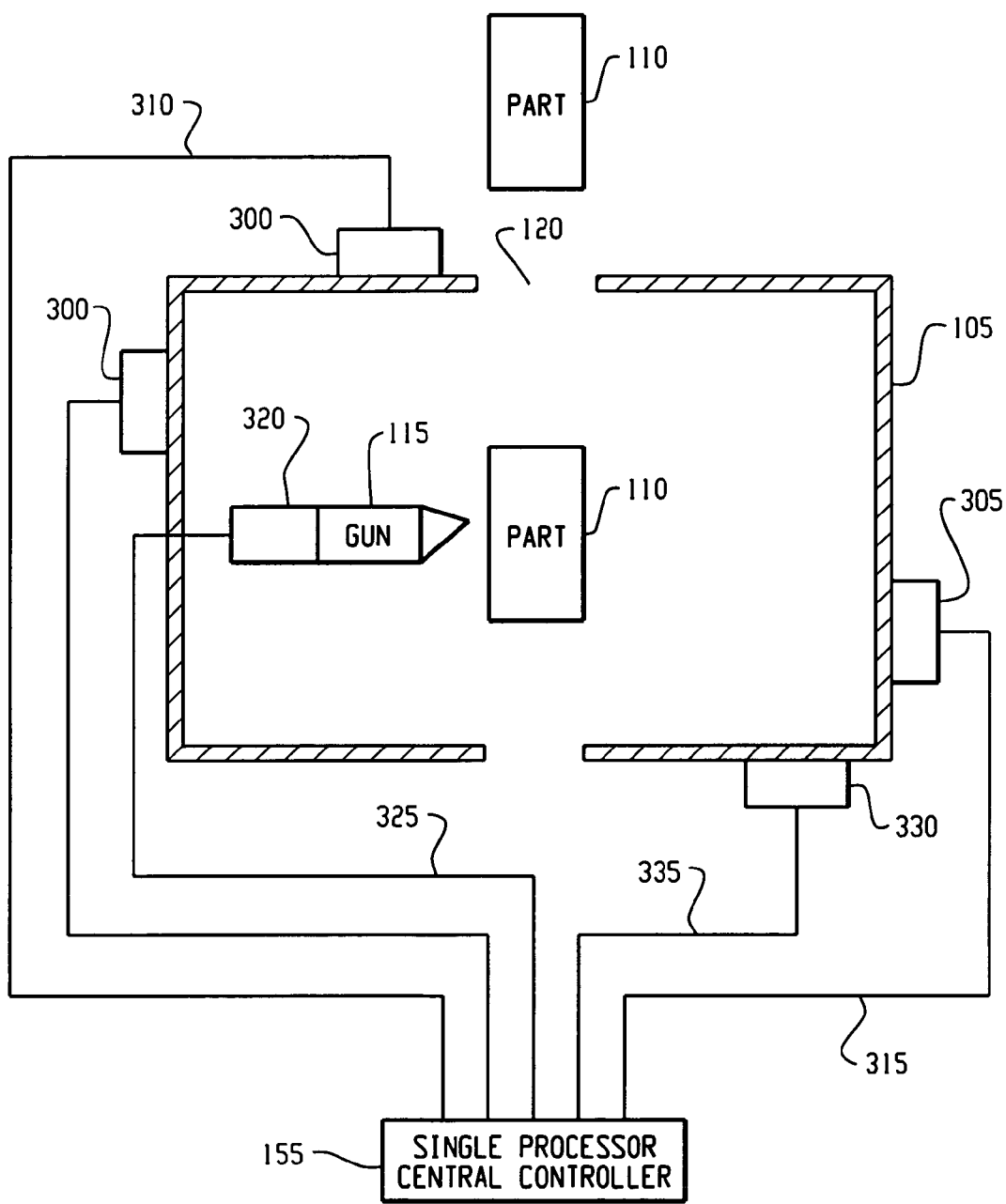
FIG. 3 is an exemplary block diagram of a powder spray system including process inputs and outputs in accordance with one embodiment of the present invention.

Process inputs 250 include any suitable input or input device relating to the powder coating system or the performance thereof. Process inputs 250 include, but are not limited to, photoeyes, encoders, light curtains and booth parameters including pressure sensors and temperature sensors, motor on/off status and interlock on/off status. With regard to FIG. 3, several process inputs 250 are shown. A photoeye 300 is any suitable optical device for obtaining an image of a part 110 as the part 110 enters and moves through a booth 105. A typical photoeye is a light beam transmitter and receiver which detects parts when the light beam is broken. Exemplary photoeyes are well known in the art and are described in the '767 et. seq. Patents and the '465 Patent and employed in the Sure/Safe Coat Systems. A photoeye 300 may be placed in any suitable location with respect to the booth 105 and the part 110. Exemplary locations include at or near the opening 120 of the booth or relative to the booth to facilitate viewing of a part in the booth. A photoeye 300 is typically electrically connected to the process input/output device 245 by any suitable connection 310, including but not limited to shielded wire. For a photoeye 300, process input/output device 245 typically comprises a suitable interface card plugged into a slot in central controller 155 and having a suitable interface plug for receiving connection 310.

Booth control sensors 305 are any suitable sensors for obtaining input regarding parameters relating to the booth 105. Exemplary booth sensors are well known in the art and are illustrated in the Sure/Safe Coat Systems, and include but are not limited to a pressure sensor and a temperature sensor. Typically, a plurality of sensors are used to determine a plurality of operating parameters of the booth. Such sensors are typically electrically connected to the process input/output device 245 by any suitable connection 315, including but not limited to shielded wire. For booth sensors 305, a process input/output device 245 typically comprises a suitable interface card plugged into a slot in central controller 155 and having a suitable interface plug for receiving connection 315.

Process outputs 255 include any suitable output or output device relating to the powder coating system or the performance thereof. Process outputs 255 include, but are not limited to, gun movement devices and booth controls, including fan motor control and filter pulsing. With regard to FIG. 3, several process outputs 255 are shown. A gun movement device 320 is any suitable device for positioning a spray gun 115 in relation to a part 110. A typical gun movement device 320 is an electromechanical device capable of physically moving a spray gun 115. Exemplary gun movement devices are well-known in the art and are employed in the Sure/Smart Coat Systems. A gun movement device 320 is typically electrically connected to the process input/output device 245 by any suitable connection 325, including but not limited to shielded wire. A typical gun movement device can change the position of a spray gun relative to a part based upon parameters inputted to the gun movement device by any suitable method, including a connection 325 as described above. For a gun movement device 320, process input/output device 245 typically comprises a suitable interface card plugged into a slot in central controller 155 and having a suitable interface plug for receiving connection 325.

Booth control devices 330 are any suitable devices for controlling a function or characteristic of a booth 105. Typical booth control device are fan/exhaust motors and filter pulsing. Exemplary booth control devices are well-known in the art and are employed in the Sure/Smart Coat Systems. Booth control devices are typically connected to elements of a booth which control certain characteristics of the booth, such as a fan or other air flow device. Booth control devices 330 are also typically electrically connected to the process input/output device 245 by any suitable connection 335, including but not limited to shielded wire. A booth control device can change a characteristic of the both by controlling a part of the booth based upon parameters inputted to the booth control device by any suitable method, including a connection 335 as described above. For a booth control device 330, process input/output device 245 typically comprises a suitable interface card plugged into a slot in central controller 155 and having a suitable interface plug for receiving connection 335.

With reference again to FIG. 2, in an additional embodiment of the present invention the system control logic 212 of the single processor central controller 155 further comprises a part identification and tracking logic 260. Part identification and tracking logic 260 identifies (with reference also to FIG. 3) a part 110 and the location of the part 110 within the booth 105 based upon a database of part information and information inputted by any suitable process input, including but not limited to photoeye 300. The database of part information may be contained within part identification and tracking logic 260 or may be contained remotely and accessed by part identification and tracking logic 260 by any suitable means. In an embodiment, the database of part information is part of central database 262 which is stored at least temporarily in memory 205. Central database 262 is a database containing information regarding a part, the coating system and any component or function thereof. Central database 262 may be any suitable database, including but not limited to, a SQL database, a flat-file database and a tagged database. Central database 262 obtains data from any suitable source by any suitable method known in the art. Part identification and tracking logic 260 is stored at least temporarily in the memory 205 for retrieval and processing by single processor 200. Part identification and tracking systems and the logic therefore are well known in the art. Exemplary part identification and tracking systems and logic are disclosed in the '767 et. seq. Patents, the '465 Patent and the Sure/Smart Coat Systems.

In an additional embodiment of the present invention, the system control logic 212 of the single processor central controller 155 further comprises a gun triggering logic 265. Gun triggering logic 265 sends triggering commands to the spray gun controllers 130 and air flow controllers 145 based upon a database of gun triggering information and information inputted by any suitable process input or central controller logic, including but not limited to part identification and tracking logic 260. Gun triggering logic 265 is stored at least temporarily in the memory 205 for retrieval and processing by single processor 200. Gun triggering systems and the logic therefore are well known in the art. Exemplary gun triggering systems and logic are disclosed in the '767 et. seq. Patents, the '465 Patent and the Sure/Smart Coat Systems. In an exemplary embodiment, gun triggering logic 265 receives part identification and part location information from part identification and tracking logic 260. Based upon the received identity and location of a part, gun triggering logic 265 accesses a database containing gun triggering information which may be accessed by part identifier and part location. The database of gun triggering information may be contained within gun triggering logic 265 or may be contained remotely and accessed by gun triggering logic by any suitable means. In an embodiment, the database gun triggering information is part of central database 262 which is stored at least temporarily in memory 205. Upon retrieving the gun triggering information from the database, gun triggering logic 265 interprets the gun triggering information and sends triggering commands to the spray gun controllers 130 and air flow controllers 145 based upon the gun triggering information.

In an additional embodiment of the present invention, the system control logic 212 of the single processor central controller 155 further comprises a gun movement logic 270. Gun movement logic 270 sends gun movement commands to any suitable process output, including but not limited to gun movement devices 320, based upon a database of gun movement information and information inputted by any suitable process input or central controller logic, including but not limited to part identification and tracking logic 260. Gun movement logic 270 is stored at least temporarily in the memory 205 for retrieval and processing by single processor 200. Gun movement systems and the logic therefore are well known in the art. Exemplary gun movement systems and logic are disclosed in the Sure/Smart Coat Systems. In an exemplary embodiment, gun movement logic 270 receives part identification and part location information from part identification and tracking logic 260. Based upon the received identity and location of a part, gun movement logic 270 accesses a database containing gun movement information which may be accessed by part identifier and part location. The database of gun movement information may be contained within gun movement logic 270 or may be contained remotely and accessed by gun movement logic by any suitable means. In an embodiment, the database of gun movement information is part of central database 262 which is stored at least temporarily in memory 205. Upon retrieving the gun movement information from the database, gun movement logic 270 interprets the gun movement information and sends moving commands to the gun movement devices 320 based upon the gun movement information.

In an additional embodiment of the present invention, the system control logic 212 of the single processor central controller 155 further comprises a booth control logic 275. Booth control logic 275 controls booth controls 330 based upon a database of booth parameters and information inputted by any suitable process input or central controller logic, including but not limited to booth control sensors 305 and part identification and tracking logic 260. Booth control logic 275 is stored at least temporarily in the memory 205 for retrieval and processing by single processor 200. Booth control systems and logic therefore are well known in the art. Exemplary booth control systems and logic are disclosed in the Sure/Smart Coat Systems. In an exemplary embodiment, booth control logic 275 controls booth controls 330 based upon booth control parameters contained in a database of booth parameters. The database of booth parameters may be contained within booth control logic or may be contained remotely and accessed by booth control logic by any suitable means. In an embodiment, the database booth parameters are part of central database 262 which is stored at least temporarily in memory 205. In another embodiment, booth control logic 275 controls booth controls 330 based upon inputs from booth control sensors 305 and booth control parameters contained in a database of booth parameters. Upon receiving information regarding booth characteristics from booth control sensors 305, booth control logic 275 compares the received values for the booth characteristics with the database parameters regarding the same booth characteristics. Booth control logic 275 controls booth controls 330 in order to adjust the values of the booth characteristics so that the values are within the parameters contained in the database.

In an additional embodiment of the present invention, the system control logic 212 of the single processor central controller 155 further comprises a part profile logic 280. Part profile logic 280 associates an identified part with a profile of characteristics regarding such part and directs components of the single processor central controller 155 to perform in accordance with the characteristics of such a profile. Part profile logic 280 is stored at least temporarily in the memory 205 for retrieval and processing by single processor 200. Part profiling systems and the logic therefore are well-known in the art. Exemplary part profile systems and logic are disclosed in the Smart Coat Systems. In an exemplary embodiment, part profile logic 280 receives a part identification from any suitable source, including but not limited to part identification and tracking logic 260. Upon receiving the part identification, part profile logic 280 searches through a database of part profiles which may be indexed by part identification. The database of part profiles may be contained within part profile logic 280 or may be contained remotely and accessed by part profile logic 280 by any suitable means. In an embodiment, the database of part profiles is part of central database 262 which is stored at least temporarily in memory 205. Upon finding a match between a part identifier and a part profile in the database, part profile logic 280 retrieves the part profile. Typically, the part profile contains information regarding a plurality of characteristics of a plurality of components of the powder coating system. For example, a part profile may contain electrical and air flow characteristics for the part, including gun triggering information and gun movement information, pump characteristics for the part and booth control characteristics for the part. Part profiling logic 280 sends the profiled characteristics to the appropriate powder coating system component so that the system is appropriately configured so as to spray the part according to the profile. For example, part profiling logic 280 calls part identification and tracking logic 260 to send electric characteristics to the gun controllers 130, calls gun triggering logic 265 and gun movement logic 270 to trigger and move the guns appropriately, calls air flow control logic 240 to adjust the air flow, and calls booth control logic 275 to adjust booth characteristics according to the profile. For each call, part profiling logic 280 sends the appropriate characteristics of the profile to the called logic module.

In an additional embodiment of the present invention, the system control logic 212 of the single processor central controller 155 further comprises a system monitoring and logging logic 285 (the "monitoring logic"). Monitoring logic 285 monitors and logs all information going through the central controller 155 and all actions taken by the central controller 155. Monitoring logic 285 is stored at least temporarily in the memory 205 for retrieval and processing by single processor 200. In an exemplary embodiment, monitoring logic 285 monitors activity of the single processor 200 and, optionally, inputs and outputs from any input/output device connected to the central controller 155. All monitored activity and information may be logged by any suitable method, including but not limited to creating a time-stamped log file of activities and information stored in the memory 205 or any other suitable storage device. In an embodiment, monitoring logic 285 monitors system activity and information flow and watches for certain pre-defined activities or characteristics which indicate that an alarm notification is appropriate. If monitoring logic 285 determines, based upon the monitored and logged information, that an alarm is appropriate, monitoring logic triggers any suitable alarm. In another embodiment, monitored and logged characteristics, including but not limited to electric characteristics, pump characteristics and booth characteristics, are used for process controls and quality systems. In yet another embodiment, monitored and logged statistics, for example, for spray times for a gun, can be analyzed to provide preventative maintenance information.

In another embodiment of the present invention, the single processor central controller further comprises a PLC input/output device 290. The PLC input/output device 290 is any suitable input/output device or combination of multiple input/output devices for facilitating data exchange and communication between the single processor central controller 155 of the present invention and a PLC 292 or similar computing device. The PLC input/output device 290 is connected to the single processor 200 by any suitable method, including via electrical connection 220. The PLC input/output device 290 is in electrical communication with PLC 292 or a similar computing device by any suitable method, including via a network cable or by a wireless network.

In another embodiment of the present invention, the single processor central controller further comprises a network input/output device 294. The network input/output device 294 is any suitable input/output device or combination of multiple input/output devices for facilitating data exchange and communication between the single processor central controller 155 of the present invention and any suitable network 296, including but not limited to the Internet, a virtual private network, a LAN, and a WAN. The network input/output device 294 is connected to the single processor 200 by any suitable method, including via electrical connection 220. The network input/output device 294 is in electrical communication with a network by any suitable method, including via a network cable or by a wireless network. In an embodiment, network input/output device 294 comprises an Ethernet port.

Figure 5:
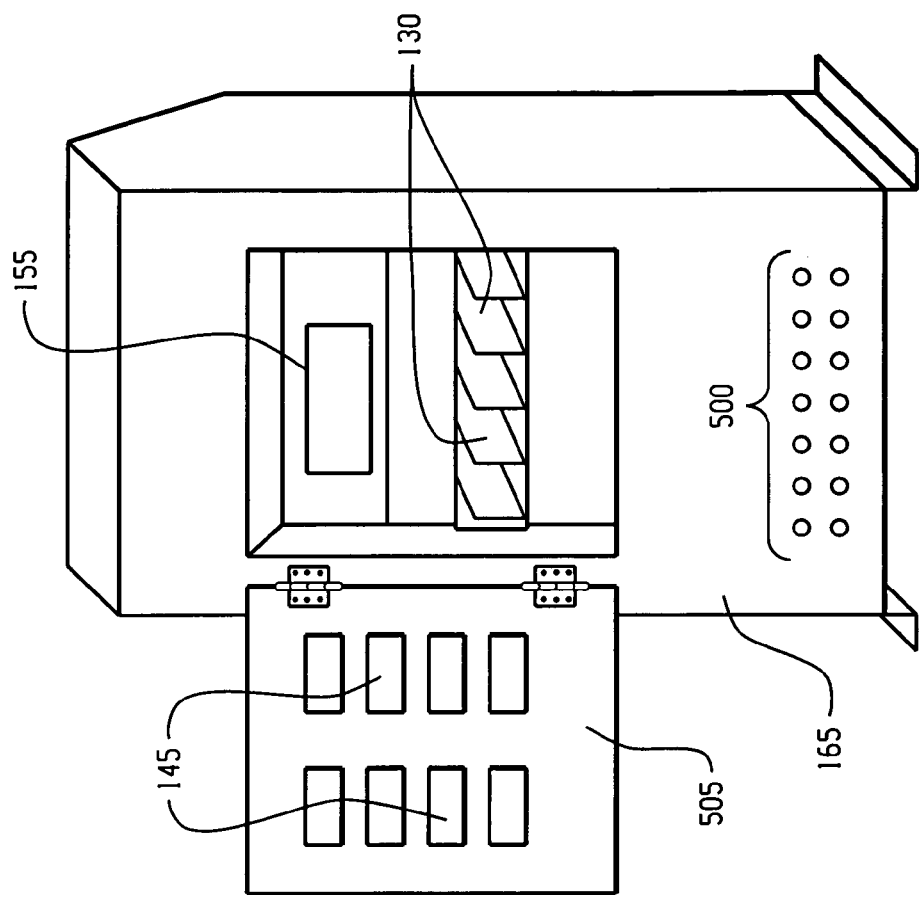
FIG. 5 is a perspective view of a controller enclosure in accordance with one embodiment of the present invention.
Figure 4:
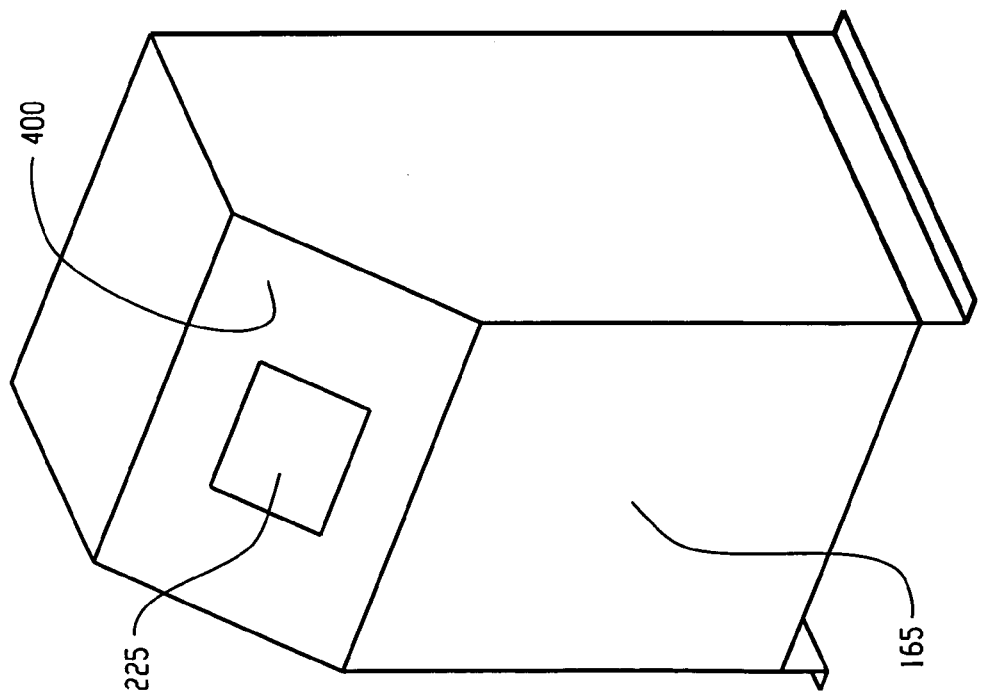
FIG. 4 is a perspective view of a controller enclosure in accordance with one embodiment of the present invention.

With reference to FIGS. 4 and 5, a single integrated enclosure 165 for a single processor central controller of the present invention is shown. Enclosure 165 encloses the control elements of the powder coating system. The control elements are components and functions which control other functions or other components of the powder coating system, and include but are not limited to the central controller 155, digital air flow controllers 145 and spray gun controllers 130. In an embodiment, the central controller 155 includes a common system processor, e.g., single processor, for controlling the gun controllers and digital air flow controllers, and optionally other centralized components and functions of the powder coating system. Display device 225 is visible on the exterior of the enclosure and mounted on the front 400 of enclosure 165 to facilitate comfortable access to the display device 225 by a user. Display device 225 is a common display for displaying characteristics and parameters of the centralized components and functions of the powder coating system, including the electrical characteristics of the gun controllers and the pump operating characteristics of the digital air flow controllers. Electrical connectors 500 are provided on the backside exterior of the enclosure 165 to facilitate connection to wired peripherals, including but not limited to connections to process inputs, process outputs, spray guns and air pumps. Electrical connectors 500 are electrically connected (not shown) to appropriate interior components, including gun controllers, digital air flow controllers and the central controller, to facilitate electrical communication between the peripherals and the interior components without having to leave door 505 open.

In an embodiment, enclosure 165 contains multiple gun controllers 130 and associated digital air flow controllers 145 for controlling up to sixteen electrostatic spray guns. In an additional embodiment of the present invention wherein a powder coating system has more spray guns than can be controlled in single enclosure 165, at least one additional enclosure containing additional gun controllers and digital air flow controllers, which is connected to enclosure 165, is provided.

Figure 6:
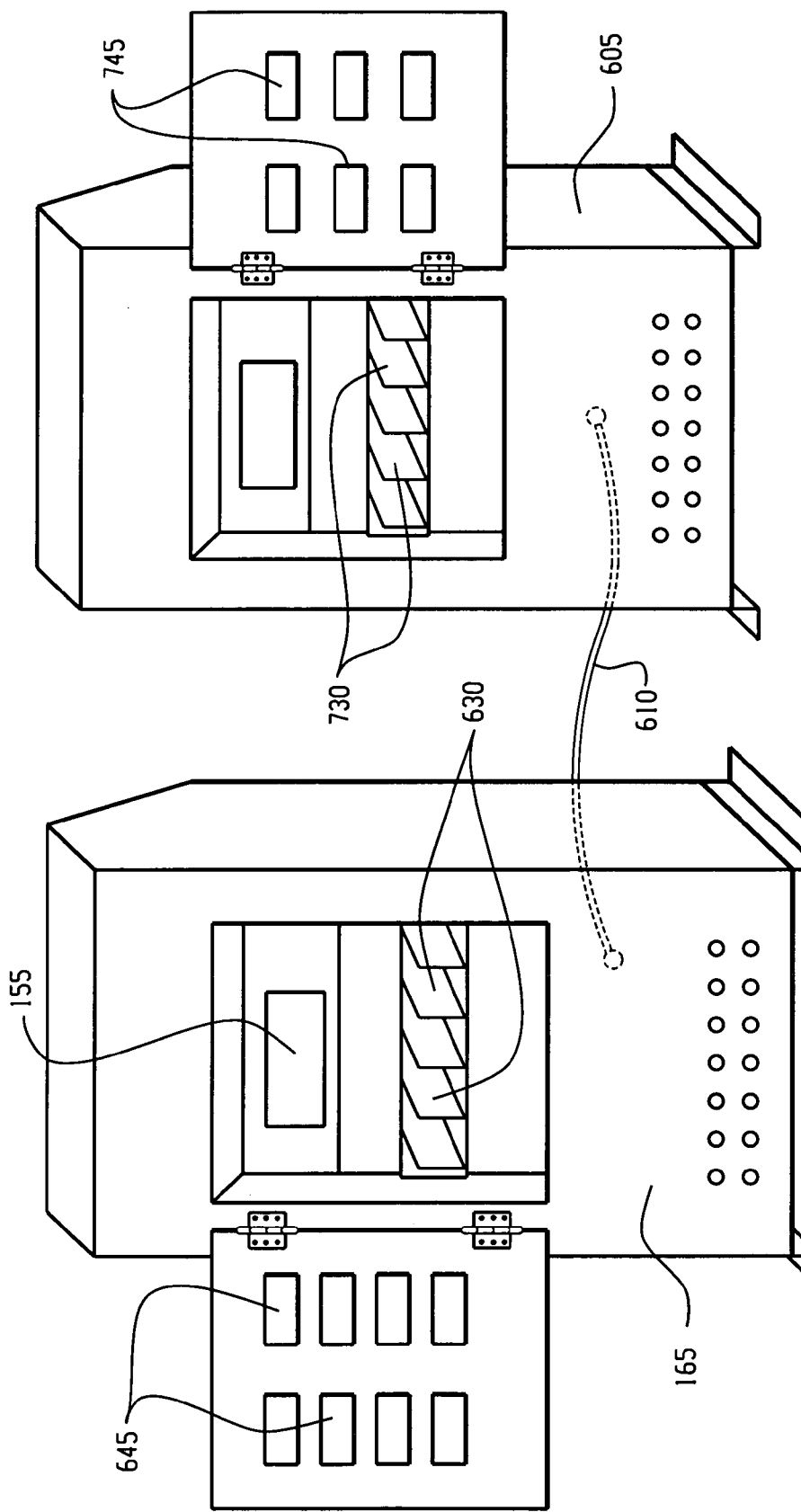
FIG. 6 is a perspective view of a first and second enclosure in accordance with one embodiment of the present invention.

With reference to FIG. 6, a first enclosure 165 and a second enclosure 605 for a single processor central controller of the present invention is shown. First enclosure 165 encloses at least central controller 155 with a common system processor, first gun control circuits 630 for controlling powder supply for an electrostatic spray gun, first air flow control circuits 645 for controlling air flow through a pump which supplies powder coating material to one of the electrostatic spray guns, and a common display (not shown) for displaying characteristics and parameters of the centralized components and functions of the powder coating system. Second enclosure 605 encloses second gun control circuits 730 for controlling the powder supply for an electrostatic spray gun and second air flow control circuits 740 for controlling the air flow through a pump which supplies powder coating material to one of the spray guns. The second gun control circuits 730 and the second air flow control circuits 740 of the second enclosure 605 are connected to the first enclosure 165 by any suitable connection 610, including but not limited to shielded wire. Connection 610 may be connected to enclosure 165 by any suitable method, including but not limited to an electrical connection to the processor and display of the first enclosure and connection to any suitable input/output device of the central controller 155. Typically, connection 610 connects to the gun controller input/output device and the air controller input/output device of the central controller. In an embodiment, connection 610 plugs into a CAN network card of the first enclosure 165.

In an embodiment, a single processor controller controls more guns and air pumps than the single enclosure 165 houses. The second enclosure 605 encloses gun and air pump controllers for spray guns beyond the capacity first enclosure 165, and facilitates control of all the gun and air pump controllers in each enclosure by a common processor and common display enclosed in the first enclosure 165. While these embodiments of the present invention have been described with reference to a first enclosure with a capacity for controlling sixteen spray guns, it will be appreciated that any suitable number of guns may be controlled by components in the first enclosure, depending upon the size of and available space within the first enclosure. Furthermore, it will be appreciated that multiple additional enclosures, each containing additional gun and air flow controllers, may be connected to a first enclosure 165 as set forth herein.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

What is claimed is:

1. A controller for an electrostatic powder coatings system, comprising:
   a first enclosure for control elements of the electrostatic powder coating system;
   first gun control circuits, each of the first gun control circuits controlling the power supply for an electrostatic powder spray gun;
   first air flow control circuits, each of the first air flow control circuits controlling the air flow through a pump which supplies powder coating material to one of the electrostatic powder spray guns;
   a single common display for the gun control circuits and air flow control circuits;
   a common system processor that retrieves and executes control logic for the first gun control circuits and first air flow control circuits, wherein the first gun control circuits, first air flow control circuits, common display and common system processor are all contained within the first enclosure;
   a second enclosure that is physically separate from said first enclosure and connected thereto by electrical connection alone;
   second gun control circuits, each of the second gun control circuits controlling the power supply for an electrostatic powder spray gun in response to said common system processor;
   second air flow control circuits, each of the second air flow control circuits controlling the air flow through a pump which supplies powder coating material to one of the electrostatic powder spray guns in response to said common system processor, wherein said second gun control circuits and second air flow control circuits are contained within said second enclosure and are connected to said common system processor and single common display; and
   said second enclosure has no processor and no visual display for said gun control and air flow control associated therewith, said second gun control and second air control circuits in said second enclosure operating exclusively from said common system processor in said first enclosure across said electrical connection and with visual access by an operator using said common display in said first enclosure.

2. The controller of claim 1, the coating system further having a plurality of air pumps, each of the air pumps having a digital air flow controller for controlling a plurality of characteristics of the pump, the controller further comprising:
   an air flow controller input/output device for electrically communicating with at least one of the digital air flow controllers and connected to the common system processor; and
   air flow control logic for controlling at least one characteristic of at least one pump, the air flow logic stored in the memory for retrieval and execution by the common system processor.

3. The controller of claim 2 wherein the gun controller input/output device and the air flow controller input/output device are located on a single input/output device.

4. The controller of claim 3 wherein the single input/output device is a CAN card.

5. The controller of claim 1, the coating system further having a plurality of process inputs and process outputs, the controller further comprising:
   a process input/output device for electrically communicating with at least one process input or process output and connected to the common system processor.

6. The controller of claim 5 further comprising:
   part identification and tracking logic for identifying and tracking a part based upon at least one input from at least one process input, the part identification and tracking logic stored in the memory for retrieval and execution by the common system processor.

7. The controller of claim 6, further comprising:
   gun triggering logic for triggering at least one gun based upon an input received from the part identification and tracking logic, the gun triggering logic stored in the memory for retrieval and execution by the common system processor.

8. The controller of claim 5, the coating system further having at least one gun movement device for moving at least one gun in electric communication with the process input/output device, the controller further comprising:
   gun movement logic for moving at least one gun and stored in the memory for retrieval and execution by the common system processor.

9. The controller of claim 5, the coating system further having at least one booth control device for controlling at least one function of a spraying booth, the booth control device in electric communication with the process input/output device, the controller further comprising:

booth control logic for controlling at least one function of the spraying booth, the booth control logic stored in the memory for retrieval and execution by the common system processor.

10. The controller of claim 1 further comprising:
gun triggering logic for triggering at least one gun and stored in the memory for retrieval and execution by the common system processor.

11. The controller of claim 1 further comprising:
part profiling logic for creating at least one profile of electric characteristics for at least one part, the part profiling logic stored in the memory for retrieval and execution by the common system processor.

12. The controller of claim 1 further comprising: system monitoring and logging logic for monitoring the coating system and logging information regarding the coating system, the system monitoring and logging logic stored in the memory for retrieval and execution by the common system processor.

13. The controller of claim 1, the coating system further having a display device, the controller further comprising:
a video input/output device for outputting at least one image on the display device and connected to the common system processor.

14. The controller of claim 13, wherein the display device is an LCD touch screen.

15. The controller of claim 1 further comprising:
a programmable logic controller input/output device for electronically communicating with a programmable logic controller and connected to the common system processor.

16. The controller of claim 1 further comprising:
a network input/output device for electronically communicating with a network and connected to the common system processor.

17. The controller of claim 1 wherein said electrical connection comprises a CAN network interface.

18. The controller of claim 1 wherein said common system processor controls more guns and air pumps than are controllable by the number of gun control and air flow control circuits enclosed in said first enclosure.

19. The controller of claim 1 wherein said second enclosure encloses gun control and air flow control circuits beyond the capacity of the number of gun control and air flow control circuits enclosed in said first enclosure, utilizing said common system processor.

20. An electrostatic powder coating system, comprising:
a plurality of spray guns and a powder spray booth, wherein said guns can be positioned in a powder spray booth with respect to a part to be sprayed;
a first enclosure for control elements of the electrostatic powder coating system;
first gun control circuits, each of the first gun control circuits controlling the power supply for an electrostatic powder spray gun;
first air flow control circuits, each of the first air flow control circuits controlling the air flow through a pump which supplies powder coating material to one of the electrostatic powder spray guns;
a common display for the gun control circuits and air flow control circuits;
a common system processor that retrieves and executes control logic for the first gun control circuits and first air flow control circuits, wherein the first gun control circuits, first air flow control circuits, common display and common system processor are all contained within the first enclosure;
a second enclosure that is physically separate from said first enclosure and connected thereto by electrical connection alone;
second gun control circuits, each of the second gun control circuits controlling the power supply for an electrostatic powder spray gun in response to said common system processor; and
second air flow control circuits, each of the second air flow control circuits controlling the air flow through a pump which supplies powder coating material to one of the electrostatic powder spray guns, wherein said second gun control circuits and second air flow control circuits are contained within said second enclosure and are connected to said common system processor and common display.

21. The powder coating system of claim 20 wherein said common system processor controls one or more of the following functions: spray booth, gun movement, part identification, part profile, monitoring and logging data, gun triggering.

* * * * *